Patented June 17, 1924.

1,498,159

UNITED STATES PATENT OFFICE.

ARTHUR EHRINGHAUS, OF GOTTINGEN, GERMANY, ASSIGNOR TO THE FIRM OF R. WINKEL G. M. B. H., OF GOTTINGEN, GERMANY.

POLARIZATION MICROSCOPE.

Application filed November 21, 1921. Serial No. 516,681.

*To all whom it may concern:*

Be it known that I, ARTHUR EHRINGHAUS, a citizen of the German Empire, and residing at Gottingen, Germany, have invented a new and useful Polarization Microscope, of which the following is a specification.

The present invention relates to a device to be adapted to a polarization microscope with tube analyser if the microscope shall be conoscopically used. As is well known, for this kind of use there is inserted behind the tube analyser a collective lens, the so-called Amici-Bertrand lens in order to attain that an image of the interference image arising in the rear focal plane of the microscope objective be produced in the front focal plane of the microscope ocular. The insertion of a tube analyser, as is well known, entails that the ray pencils producing the image become astigmatic. According to the invention the said astigmatism may be rendered sufficiently harmless by disposing in the vicinity of the Amici-Bertrand lens a slit diaphragm. By adjusting the latter in such a manner that the longitudinal direction of the slit is either parallel or perpendicular to the polarization plane of the analyser, it is attained that only the rays appertaining to the one or the other of the two focal lines of the pencil used become effective; the cause of the well-known unrest of the astigmatic image is thereby removed since the observer is not any more in the position to always conform his accommodation alternately to the one and the other group of rays. By rotating the diaphragm by 90° in its plane, the observer can pass from the use of the one group of rays to that of the other; by adjusting the ocular-draw the displacement of the image caused by the said passing is to be taken into account.

Figure 1:
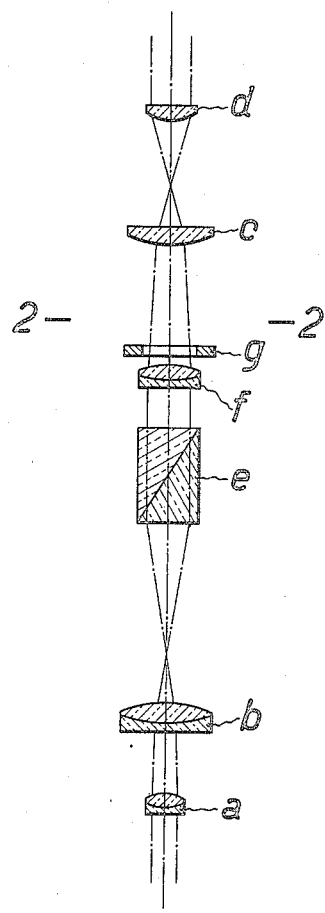
Figure 2:
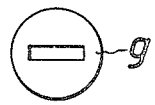

The annexed drawing shows as a constructional example the optical system of a microscope according to the invention; Fig. 1 shows a longitudinal section, Fig. 2 a cross section along the line 2—2 of Fig. 1.

The microscope objective consists of the lenses $a$ and $b$, the (Huygenian) ocular of the lenses $c$ and $d$. The polarization prism is marked $e$, the Amici-Bertrand lens $f$. The slit diaphragm $g$, the mode of acting of which has been explained above, is disposed directly behind the Amici-Bertrand lens $f$.

I claim:

In a polarization microscope an objective, a polarization prism behind this objective, a collective lens placed behind this prism and adapted to form an image of the interference image arising in the rear focal plane of the objective when an object is placed in the front focal plane of the objective, an ocular for observing the image formed by the said collective lens, and a slit diaphragm disposed in the vicinity of the said collective lens.

ARTHUR EHRINGHAUS.

Witnesses:
PAUL KRÜGER,
FRITZ SANDER.